United States Patent [19]

Fitzmayer

[11] 3,748,424
[45] July 24, 1973

[54] BUILT-IN LEAKAGE RADIATION DETECTING DEVICE FOR A MICROWAVE OVEN

[75] Inventor: Louis H. Fitzmayer, Louisville, Ky.

[73] Assignee: General Electric Company, Louisville, Ky.

[22] Filed: Aug. 7, 1972

[21] Appl. No.: 278,596

[52] U.S. Cl. .............................. 219/10.55, 324/122
[51] Int. Cl. .............................................. H05b 9/06
[58] Field of Search.................... 219/10.55; 324/95, 324/122; 325/67, 363

[56] References Cited
OTHER PUBLICATIONS

Movchan, Zatenko, and Konoenko, "Waveguide Gas-- Discharge Indicator of Flowing Microwave Power," Radio Engineering and Electric Physics, Vol. 15, No. 3, 1970.

Primary Examiner—J. V. Truhe
Assistant Examiner—Hugh D. Jaeger
Attorney—Richard L. Caslin et al.

[57] ABSTRACT

An electronic microwave oven has incorporated therewithin a leakage radiation detecting device for sensing and providing an indication of the presence of radiation escaping from the oven cavity past the door seal. The device, located within the oven door, includes a pickup loop, sensitive to the magnetic field of the microwave radiation, partially projecting into the channel formed by the inner surface of the door and the door frame external to the seal gasket. A transmission line, located coaxially within a cylindrical waveguide communicating with the leakage radiation, is resonant to a quarter wavelength of the operating microwave frequency and operatively couples the pickup loop with a neon lamp. When radiation above a predetermined level escapes from the oven cavity, a voltage is induced within the pickup loop which, by virtue of the resonance effect of the transmission line, is sufficient to light the neon lamp.

5 Claims, 5 Drawing Figures

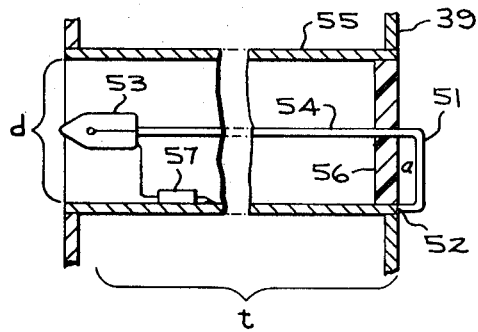
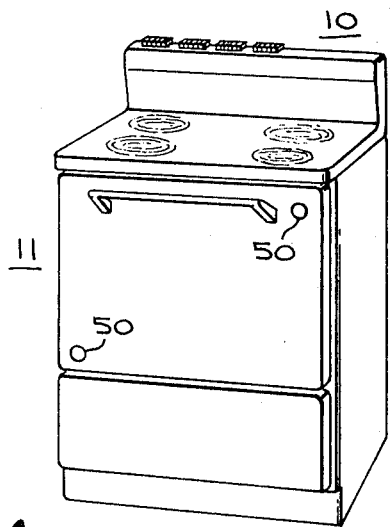
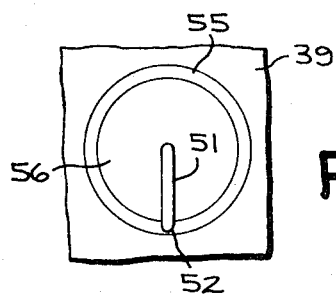
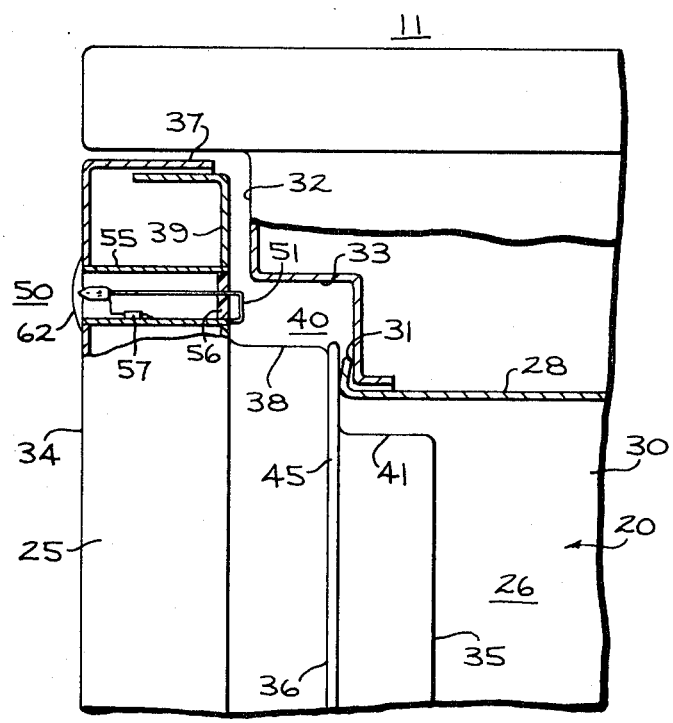
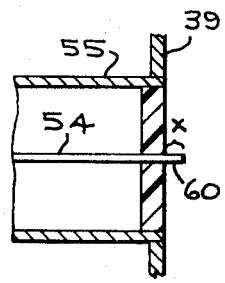

3,748,424

BUILT-IN LEAKAGE RADIATION DETECTING DEVICE FOR A MICROWAVE OVEN

BACKGROUND OF THE INVENTION

The present invention relates to a device for sensing and indicating the presence of microwave radiation and in particular, a device built into a domestic microwave oven for sensing and indicating the presence of microwave radiation leaking from the oven cavity past the oven door seal.

Manufacturers of electronic microwave ovens take extreme care in the design of the oven to insure the safety of the user against leakage of microwave radiation, particularly around the oven door seal. However, despite the precautions taken by the manufacturer, it is sometimes possible for an oven to become leaky during its lifetime due to aging of the door seal gasket or due to accumulation of spilled food particles on the door seal. For the safety of the user, the Department of Health, Education and Welfare/Bureau of Radiological Health regulations specify that the maximum allowable leakage from any oven surface, other than in-factory measurements, be 5 milliwatts per square centimeter measured 5 centimeters from any oven surface.

A reliable device is needed, therefore, to sense and give to the operator an indication of possible leakage radiation at such a low level. One device is described in U.S. Pat. No. 3,436,508-Fritz wherein a pair of conductors are located on the oven cabinet just beyond the outer edge of the door opening and looped therearound and which are connected to an alarm means for announcing the presence of leakage radiation. Such a device, however, has certain disadvantages, the most important of which is lack of sensitivity. With conductor wires mounted in such a fashion, there is very little possibility of their being responsive to the electric field of the radiation since they generally would not be parallel with this electric field. Neither would they be responsive to the magnetic field of the radiation, the net effect upon the wires in this case being normally close to zero.

It is therefore the principle object of this invention to provide a device built into a domestic microwave oven for sensing and indicating the presence of microwave radiation leaking from the oven cavity past the door seal, a device that is sensitive to such small leaks as mentioned above and is simple and trouble free as well as reliable and low cost.

SUMMARY OF THE INVENTION

In accordance with the present invention, a leakage radiation detecting device is designed to be incorporated within a microwave oven of the type having a box-like oven liner and an access door defining an oven cooking cavity. Microwave radiation seal means are provided between the door and the oven liner. Included is sensor means partially projecting into the space formed between the access door and the oven frame external to the seal means, the sensor means arranged so as to communicate with the magnetic field of the microwave leakage radiation. transmission means, resonant to the operating microwave frequency and located coaxially within a waveguide communicating with the leakage radiation, is coupled with the sensor means. Indicator means, responsive to the output of the resonant transmission means, is coupled therewith.

BRIEF DESCRIPTION OF THE DRAWINGS

In the accompanying drawings:

FIG. 1 is a perspective view of a typical domestic freestanding range including an electronic microwave oven;

FIG. 2 is an enlarged fragmentary view, partly in section, taken along the line 2—2 of FIG. 1, of a portion of an electronic microwave oven incorporating a preferred embodiment of the present invention;

FIG. 3 is a further enlarged sectional view of a preferred embodiment of the present invention shown in FIG. 2;

FIG. 4 is an end elevation of the view in FIG. 3; and

FIG. 5 is a fragmentary view of the device of FIG. 2 showing an alternate embodiment of the present invention.

DESCRIPTION OF THE PREFERRED EMBODIMENT

Referring to FIG. 1 of the drawing, there is illustrated a household electric range 10, the range 10 including an electronic microwave oven 11 embodying the features of the present invention.

Referring now to FIG. 2, a substantially box-like metallic oven liner 20, a portion of which is shown, in conjunction with a metallic access door 25, shown in the closed or vertical position, defines a microwave oven cooking cavity 26 therein. Liner 20 includes a rear wall (not shown), a top wall 28 (partially shown), a bottom wall (not shown), and a pair of side walls 30, one of which is shown. Forward edges of the top wall 28, the bottom wall and the side wall 30 define an opening into the cooking cavity 26, there being a continuous outwardly facing flange 31 which is bent back upon itself on its rear surface as shown. The front door frame 32 has an opening therein slightly greater than the area defined by the outer edges of the flange 31 and has a rearwardly directed flange 33 which is suitably secured to the several walls of the oven liner 20 so as to interconnect the front door frame 32 and the oven liner 20.

Front opening access door 25 is mounted on the front of the oven 11 by hinge structure (not shown) and is movable about the lower edge thereof between a substantially horizontal open position and a substantially vertical closed position with respect to the open front of the oven cavity 26. Access door 25 more particularly includes a metal outer sheet 34, a metal inner sheet 35 spaced well inwardly of the outer sheet 34, and a metal intermediate sheet 36 disposed between the outer sheet 34 and the inner sheet 35. The outer sheet 34 carries an inturned flange 37 around the periphery thereof, flange 37 extending inwardly toward and to a point spaced a short distance from the front door frame 32 when the access door 25 is in its sheet 36 position. Intermediate sheet 36 has a forwardly directed flange 38 that carries an outwardly directed flange 39 extending therearound, flange 39 being suitably secured to flange 37. As illustrated, flange 38 forming a portion of the inner surface of the door 25 is disposed substantially parallel to and spaced a short distance from a portion of the flange 33 so as to define a channel like space such as continuous channel 40. Inner sheet 35 has a forwardly directed flange 41 around the periphery thereof extending toward the intermediate sheet 36 and is suitably secured thereto.

Microwave radiation seal means, such as metallic radiation seal gasket 45, is fixedly attached to the intermediate sheet 36 of door 25 and provides a seal and an electrical connection between the outer surface of the oven liner 20 and the inner surface of the door 25 and specifically, between the outwardly facing flange 31 on the oven liner 20 and the intermediate sheet 36 of the access door 25. Gasket 45 may be of the type described in U.S. Pat. No. 3,459,921-Fussell and assigned to the same assignee as the present invention.

In accordance with the present invention a leakage radiation detecting device, such as that denoted generally as 50 in FIG. 2, is designed to be incorporated within microwave oven 11. Device 50 includes sensor means such as pickup loop 51 partially projecting into channel 40 so as to communicate with the magnetic field of the microwave leakage radiation. As can be more clearly seen in FIG. 3, pickup loop 51 has one leg coupled to a common terminal as 52. Pickup loop 51 has its other leg connected to indicator means such as neon lamp 53 through transmission means such as transmission line 54 located coaxially within a generally cylindrical waveguide 55. Spacing and isolation of transmission line 54 from waveguide 55 is accomplished by insulator 56, more clearly shown in FIG. 4. Waveguide 55 communicates with the leakage radiation through channel 40 and transmission line 54 is a frequency resonant conductor, resonant to the operating microwave frequency of microwave oven 11.

Neon lamp 53 is mounted within the door structure so as to be visible from the outside of the oven 11 and has its other terminal serially coupled to common terminal 52 through a resistance such as current limiting resistor 57, thereby completing the electric circuit with pickup loop 51. There may be a capacitive or direct connection between resistor 57 and common terminal 52.

Radiation leaking from oven cavity 26 past seal gasket 45 at any location thereof, will find its way into the space between the door 25 and the oven frame and especially within channel 40. Channel 40 in this case will be acting as a waveguide and a standing wave will be set up in the channel 40 around the entire periphery thereof. In the operation of the device of the present invention, since pickup loop 51 is sensitive to the magnetic field of the microwave radiation and since it is arranged to communicate therewith, a changing magnetic field will cause a voltage to be induced within pickup loop 51. This voltage will likewise appear in transmission line 54 and since waveguide 55 communicates with channel 40, and further since some of the leakage radiation will also appear in waveguide 55, transmission line 54 will become resonant and the voltage appearing therein will be amplified causing neon lamp 53 to become activated.

An alternate embodiment is shown in FIG. 5 wherein a probe 60 is sensitive to the electric field of the microwave radiation. Since probe 60 communicates with the electric field, a voltage will be generated within the probe which will be caused to be amplified within transmission line 54 further causing neon lamp 53 to become activated.

In laboratory tests, waveguide 55 was made of stainless steel tubing with the inside diameter represented by the letter $d$ in FIG. 3, chosen to be three-quarters of an inch. Resonant transmission line 54 was made of 1/8 inch diameter stainless steel tubing joined with one of the electrodes of neon lamp 53 with the length represented by the letter $l$ in FIG. 3 chosen to be resonant to a quarter wavelength of the operating microwave frequency, which in this case was 915 MHz, thereby giving $l$ a length of approximately 3 inches. Insulator 56 was made of Teflon. It was found that if probe 60 projected into the electric field, as shown in FIG. 5 by the distance $x$, and if this distance were 1/8 inch, leakage radiation of energy levels as low as five milliwatts per square centimeter measured 5 centimeters from any oven surface, could be detected.

For purposes of calibrating device 50 to become activated only at radiation levels above a predetermined level, the length $x$ of probe 60 in FIG. 5 need only be varied, i.e., for more sensitivity, the length will be increased. For a sensor of the type of pickup loop 51, which is sensitive to the changing magnetic field of the radiation, one need change the area $a$ shown in FIG. 3 to vary its sensitivity, i.e., for more sensitivity, the area will be increased.

For further sensitivity a pair of such devices 50 could be mounted within door 25 as shown in FIG. 1 at alternate corners of the door. Further, the lens 62 is added to protect the neon lamp as well as to enhance the appearance of the structure and to make the lighted lamp more clearly visible.

It should be apparent to those skilled in the art that the embodiments described heretofore are considered to be the presently preferred form of this invention. In accordance with the Patent Statutes, changes may be made in the disclosed apparatus and the manner in which it is used without actually departing from the true spirit and scope of this invention.

What is claimed is:

1. In a microwave oven of the type having a box-like oven liner and an access door defining an oven cooking cavity, and microwave radiation seal means between the door and oven liner, a leakage radiation detecting device comprising:

sensor means partially projecting into the space formed between the access door and the oven frame external to the seal means, the sensor means being sensitive to and arranged so as to communicate with the magnetic field of the microwave leakage radiation;

transmission line means, resonant to the operating microwave frequency, coupled with the sensor means and located coaxially within a waveguide communicating with the leakage radiation; and indicator means coupled with and responsive to the output of the resonant transmission means to become activated;

whereby, in the presence of radiation above a predetermined level leaking from the oven cavity past the seal means, a voltage induced in the sensor means will be amplified in the resonant transmission line means sufficiently to activate the indicator means to provide an indicium of the presence of such leakage radiation.

2. The device of claim 1 wherein the sensor means is arranged so as to communicate with the electric field of the microwave leakage radiation and is sensitive thereto such that a voltage will be generated in the sensor means to be amplified in the resonant transmission line means.

3. In a microwave oven having a metallic box-like oven liner and a metallic access door hingedly attached to the oven at the bottom thereof forming an oven cooking cavity, a front frame surrounding the oven liner, means for supplying microwave energy to the oven cavity, a conductive radiation seal gasket attached to the inner surface of the door and positioned to contact the liner flange around the entire periphery thereof when the door is closed, and a continuous channel-like space defined by the inner surface of the door and the front frame external to the seal gasket, a leakage radiation detecting device comprising:

a sensor partially projecting into the channel-like space and sensitive to and arranged so as to communicate with the magnetic field of the microwave leakage radiation;

a transmission line, resonant to the operating microwave frequency, operatively coupled with the sensor and located coaxially within and isolated from a waveguide communicating with the channel-like space and thereby, the leakage radiation; and an indicator coupled with and responsive to the output of the resonant transmission line to become activated.

4. The device of claim 3 wherein the sensor is arranged so as to communicate with and is sensitive to the electric field of the microwave leakage radiation.

5. In a microwave oven having a metallic box-like oven liner and a metallic access door hingedly attached to the oven at the bottom thereof forming an oven cooking cavity, a front frame surrounding the oven liner, means for supplying microwave energy to the oven cavity, a metallic radiation seal gasket attached to the inner surface of the door and positioned to contact the liner flange around the entire periphery thereof when the door is closed, and a continuous channel defined by the inner surface of the door and the front frame external to the seal gasket, a leakage radiation detecting device located within the door comprising:

an inductive pickup loop partially projecting into the channel and arranged so as to communicate with the magnetic field of the microwave leakage radiation;

a conductive transmission line resonant to a quarter wavelength of the operating microwave frequency, operatively coupled with the pickup loop and located coaxially within and isolated from a cylindrical waveguide and communicating with the channel and thereby the leakage radiation; and a neon lamp having one of its terminals coupled with and responsive to the output of the resonant transmission line to become activated, and the other terminal connected with a common ground and thereby with the pickup loop to complete the circuit.

* * * * *